United States Patent
Brake et al.

(10) Patent No.: US 9,754,028 B2
(45) Date of Patent: *Sep. 5, 2017

(54) AUTOMATIC CRAWLING OF ENCODED DYNAMIC URLS

(75) Inventors: Nevon C. Brake, Kanata (CA); Obidul Islam, Kanata (CA); Adi Sharabani, Ramat Gan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 285 days.

This patent is subject to a terminal disclaimer.

(21) Appl. No.: 13/459,536

(22) Filed: Apr. 30, 2012

(65) Prior Publication Data

US 2013/0091115 A1    Apr. 11, 2013

Related U.S. Application Data

(63) Continuation of application No. 13/270,806, filed on Oct. 11, 2011.

(51) Int. Cl.
G06F 17/30 (2006.01)

(52) U.S. Cl.
CPC .............................. *G06F 17/30864* (2013.01)

(58) Field of Classification Search
CPC ......... G06F 17/30882; G06F 17/30864; G06F 17/30002
See application file for complete search history.

(56) References Cited

U.S. PATENT DOCUMENTS

| | | | |
|---|---|---|---|
| 7,680,773 B1 | 3/2010 | Acharya et al. | |
| 2003/0187925 A1* | 10/2003 | Inala et al. | 709/204 |
| 2007/0136456 A1* | 6/2007 | Behl | G06F 17/3089 709/224 |
| 2007/0245027 A1* | 10/2007 | Ghosh | H04L 29/12594 709/228 |
| 2008/0091685 A1* | 4/2008 | Garg et al. | 707/10 |
| 2010/0094884 A1* | 4/2010 | Baldwin | G06F 17/3089 707/755 |

OTHER PUBLICATIONS w3schools.com; HTML URL Encoding Reference; http://www.w3schools.com/TAGS/ref_urlencode.asp; Dated with Internet Archive: Mar. 16, 2010, pp. 1-9.*
GoogleSearchAppliance; Managing Search for Controlled-Access Content: Crawl, Index, and Serve; Oct. 2010; pp. 1-35; https://developers.google.com/search-appliance/documentation/68/secure_search/secure_search_crwlsrv.*

(Continued)

*Primary Examiner* — Amanda Willis
(74) *Attorney, Agent, or Firm* — Cantor Colburn LLP; Maeve Carpenter

(57) ABSTRACT

A method includes retrieving navigational state information corresponding to a URL; analyzing which navigational state to consider for page identification; comparing the navigational state information to previously stored navigational state information corresponding to one or more previously visited URLs; determining if the URL has been previously visited; and retrieving content associated with the URL if the URL has not been previously visited.

6 Claims, 5 Drawing Sheets

(56) References Cited

OTHER PUBLICATIONS

Computer Hope.com; URL; Mar. 14, 2009; pp. 1-6 Archived version: https://web.archive.org/web/20090314105027/http://computerhope.com/jargon/u/url.htm Original URL: http://computerhope.com/jargon/u/url.htm.*

Webopedia; Portal; Printed Jan. 29, 2014; URL: http://www.webopedia.com/TERM/P/portal.htm.*

Bar et al., "Do Not Crawl in the Dust: Different URLs With Similar Text", WWW 2007; May 8-12, 2007, pp. 111-120, Track: Data Mining; Session: Mining Textual Data.

* cited by examiner

| State information | Description | Purpose | Required value |
| --- | --- | --- | --- |
| selection-node | Object ID of the currently selected node a URL refers to | Detect visited page | Object id |
| resource-ID | Object ID of a resource type URL | Detect visited page | Object Id |
| portlet-ID | ID attribute of the portlet node specifies the object-ID (OID) | Extend coverage | Object id |
| portlet-mode | Allows a portlet to display different user interface. Available modes are: view, edit, help and configure | Extend coverage | All modes except view |
| window-state | Allows a user to change how portlet window will be displayed within portal. Available states are: maximize, minimize and normal | Extend coverage | Maximize and minimize |
| action-type | Action on this link causes login status at server | Detect logout link | Type attribute value |

FIG. 3

AUTOMATIC CRAWLING OF ENCODED DYNAMIC URLS

CROSS REFERENCE TO RELATED APPLICATION

This application is a continuation application of the legally related U.S. Ser. No. 13/270,806 filed Oct. 11, 2011, the contents of which are incorporated by reference herein in their entirety.

BACKGROUND

The present disclosure relates to automatic crawling of web content, and more specifically, to automatic crawling of web content having encoded and dynamic URLs.

A web-crawler searches, or spiders, websites in an automated way to gather and analyze information for different purposes. The automatic navigation is based on identification of visited webpage, also referred to uniform resource locators (URLs), and discovering new ones. Many sites, in particular search engines, use automatic crawling, as a means of providing up-to-date data. Web-crawlers can also be used for automating maintenance tasks on websites, such as checking links or validating HTML code.

A web-crawler starts with a list of URLs to visit, generally called seeds. As the crawler visits these URLs, it identifies all the hyperlinks in the pages and adds them to the list of URLs to visit. These URLs are recursively visited according to a set of policies. Web-crawlers are used to create a copy of all the visited pages for later processing by a search engine that will index the downloaded pages to provide fast searches. Web-crawlers often need to determine if a particular webpage, or URL, is unique. This information is used to determine if a subsequently visited webpage, or URL, being visited is new or a duplicate of one visited before.

SUMMARY

According to one embodiment of the present disclosure, a method of crawling URLs that are encoded and highly dynamic includes retrieving navigational state information corresponding to a URL; comparing the navigational state information to previously stored navigational state information corresponding to one or more previously visited URLs; determining if the URL has been previously visited; and retrieving content associated with the URL if the URL has not been previously visited.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

FIG. 3 is a table of exemplary navigation state information used by the methods depicted in FIGS. 2 and 4;

DETAILED DESCRIPTION

Figure 1:
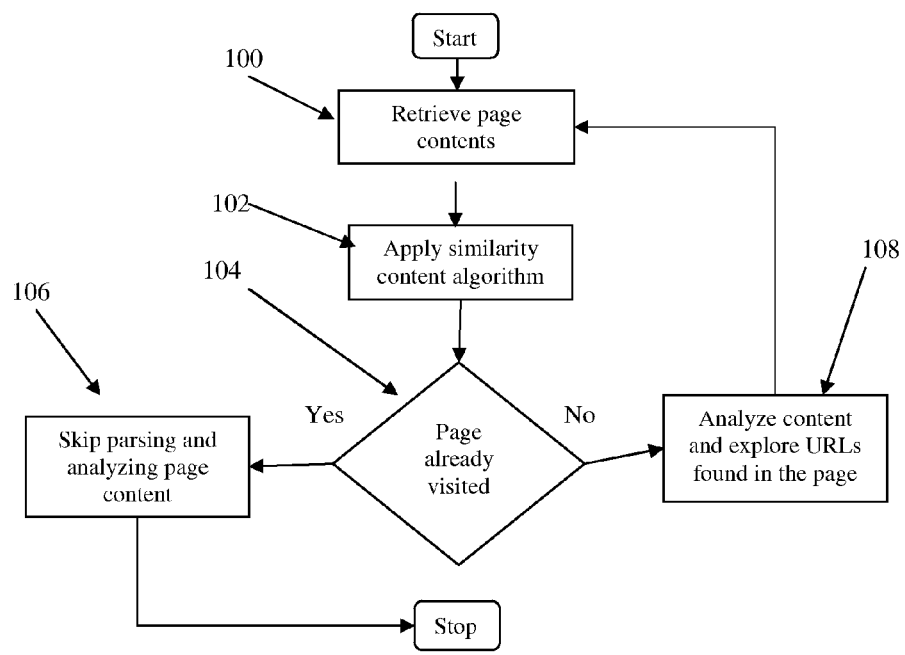
FIG. 1 is a flow diagram illustrating the operation of a web-crawler.

Referring now to FIG. 1, a flow diagram illustrating the operation of typical web-crawler is shown. At block 100, the web-crawler retrieves the contents of a webpage or URL. Next, the web-crawler applies a similarity algorithm to the contents of the URL, as shown at block 102. Once the similarity algorithm has been applied, the web-crawler determines if the URL has been visited before, as shown at decision block 104. If the URL has been visited before, the web-crawler skips parsing of the URL, as shown at block 106. Otherwise, the web-crawler analyzes the content of the URL and explores any additional URLs found in the content of the webpage, as shown at block 108. As illustrated, typical web-crawlers download content referred to by an URL in order to detect whether the URL has been previously explored or not.

URLs may be encoded, meaning that they do not provide any information about the content that they refer to. In addition, URLs for a single webpage may be dynamic or frequently changed. Furthermore, in some cases different URLs may refer to same content. Due to the nature of encoded and dynamic URLs, web-crawlers, such as the one depicted in FIG. 1, may fail to accurately identify that a URL has been previously visited, which results in the web-crawler repeatedly scanning and downloading the content of a single URL multiple times.

URLs can refer to web portal applications that often contain portlets that can be rearranged in a webpage. Portlets are pluggable user interface software components that are managed and displayed in a web portal. Typically, a web portal page is displayed as a collection of non-overlapping portlet windows, where each portlet window displays a portlet. Accordingly a portlet, or collection of portlets, resembles a web-based application that is hosted in a portal. Some examples of portlet applications are email, weather reports, discussion forums, and news. Many web-crawlers treat web portal pages that contain identical portlets in different arrangements as distinct web pages because the web-crawlers assign each page a different identification code. In addition some web portal applications, such as IBM's WebSphere Portal application, use encoded and/or highly dynamic URLs.

Figure 2:
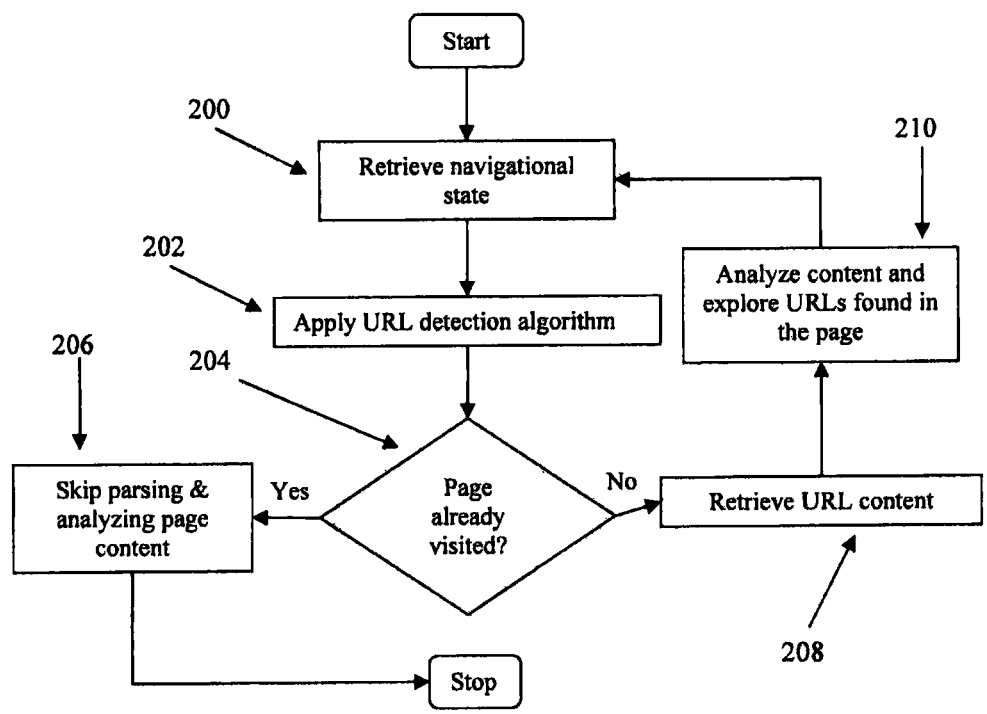
FIG. 2 is a flow diagram illustrating a method of crawling URLs that are encoded and highly dynamic in accordance with an embodiment of the disclosure.

Referring now to FIG. 2, a flow diagram illustrating a method of crawling URLs that are encoded and highly dynamic in accordance with an embodiment of the disclosure is shown. The first step in the method, as illustrated at block 200, is to retrieve navigational state information for the URL. Once the navigational state information has been retrieved, then a URL detection algorithm is applied to the navigational state information, as shown at block 202. At decision block 204, it is determined if the URL, or webpage, has already been visited by the web-crawler. If the URL has been visited, the contents of the URL are not downloaded, parsed or analyzed, as shown at block 206. Otherwise, the contents of the URL are downloaded, as shown at block 208.

Once the URL content has been downloaded, the URL content is analyzed and any additional URLs found on the page are explored, as shown at block 210. As illustrated, the web-crawler does not require retrieving content referred by an URL to detect whether that URL has been visited or not. Instead, the web-crawler only retrieves navigational state information of the encoded URL and applies a URL detection algorithm on it. Thus, the web-crawler avoids downloading redundant content, which saves network bandwidth and enables faster crawling of web sites.

In an exemplary embodiment, the web-crawler uses navigational state information to identify encoded and dynamic URLs. Navigational state information can include, but is not limited to, navigational path, selected page, target portlets and additional information which specify the view associated with a specific client. In exemplary embodiments, one or more pieces of navigation sate information are required for URL identification. The web-crawler not only uses navigational state information of web portal URLs to identify the URL, it may also identify which piece of navigational state information to consider for the purpose of identifying the URL.

In exemplary embodiments, the web-crawler is also capable of identifying URLs that have various arrangements of the same portlets. For example, a webpage has three portlets (A, B and C) and a java script action on the webpage changes the location of portlet A and C. Although the location of the portlets has changed, the content of the webpage remains unchanged. Therefore, the webpage will be detected as the same by the web-crawler.

Web portal services, such as IBM's WebSphere Portal framework, include a representational state transfer (REST) service, or application program interface (API), which decodes and encodes navigational state information to and from URLs. In exemplary embodiments, the web portal REST API also provides navigational state information for a URL. The dynamic nature of URLs can also present in some of the navigational state information. For example, different pieces of navigational state information can point to the same content or view. Therefore, not all navigational state information can be used to uniquely identify URLs. Accordingly, to uniquely identify URLs the web-crawler will not consider the dynamic part of the navigational state information and will only incorporate relevant navigational state information in the URL identification process.

Referring now to FIG. 3, a table illustrating exemplary navigational state information that can be used to uniquely identify URLs and extend scan coverage is shown. The navigational state information may include: selection-node information, which is the object ID of the currently selected node a URL refers to; resource-ID information, which is the object ID of a resource type URL; portlet-ID information, which is an ID of the portlet node which specifies the object-ID (OID); portlet-mode information that allows a portlet to display different user interface; window-state information that allows a user to change how portlet window will be displayed within portal; and action-type information which specifies that action on this link causes login status at server. In an exemplary embodiment, the selection-node and resource-ID information enable the web-crawler to detect if a URL has been previously visited. For a particular URL, these two pieces of information remain unchanged regardless how a user navigates to that page. Therefore, the web-crawler can use this information to detect visited content during automatic crawling. Moreover, the web-crawler can use portlet-mode and window-state information to discover new links. In addition, action-type information can be used to detect whether the web-crawler is about to explore a logout link. Detecting a logout link allows the web-crawler to continue a current scan session.

Figure 4:
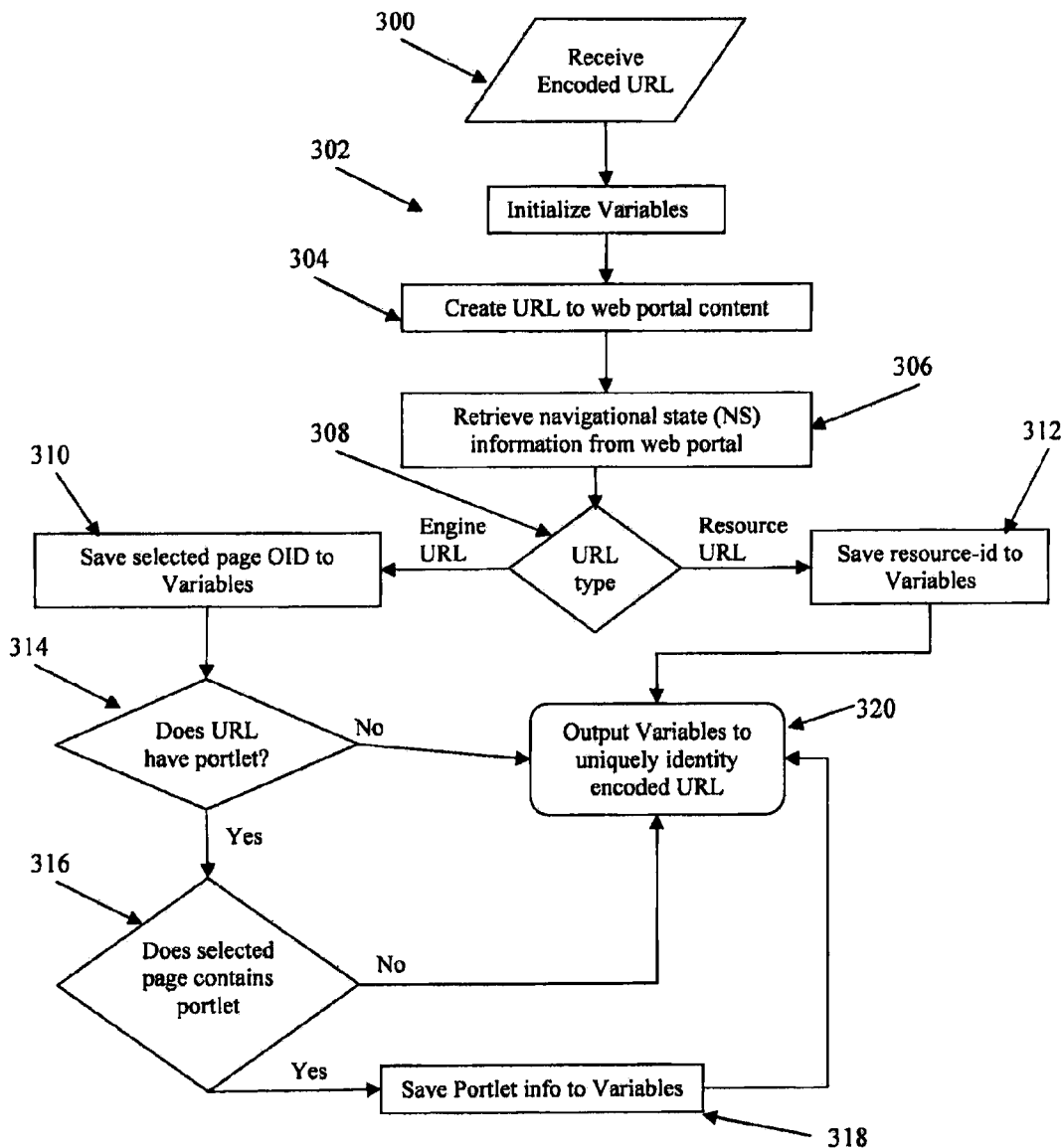
FIG. 4 is a flow diagram illustrating a method of uniquely identifying an encoded URL in accordance with another embodiment of the disclosure.

Referring now to FIG. 4, a flow diagram illustrating a method of uniquely identifying a URL that is encoded and/or dynamic in accordance with an embodiment of the disclosure is shown. The first step in the method, shown at block 300, is to receive an encoded URL as input. Next, various variables used by the method are initialized, as shown at block 302. In an exemplary embodiment, a variable list which is used to store navigation state information corresponding to the input URL is initialized. Next, a URL to representational state transfer (REST) service is created which decodes the input URL, as shown at block 304. Once the REST service URL is created, the navigational state information for the input URL is retrieved as shown at block 306. In exemplary embodiments, the navigation state information may be provided in an application or XML format. Once the navigational state information is received, the URL type is determined, as shown at decision block 308. In exemplary embodiments, the URL type may indicate whether the URL represents a resource URL or a portlet URL. In an embodiment, the URL type may be determined by checking for the presence of the state-node variable in the navigational state information. If the URL is a resource URL, the resource-ID is added to the variable list which represents navigation state information of the input URL, as shown at block 312.

Continuing with reference to FIG. 4, if it is determined that the URL is a engine URL, the selection-node-ID is added to the variable list which represents navigation state information of the input URL, as shown at block 310. Next, at decision block 314, the navigational state information is checked for the presence of a portlet node. In exemplary embodiments, the presence of a portlet node in the navigational state information indicates that the URL is portlet generated and information about portlet needs to be collected. At decision block 316, the method includes determining whether the portlet is actually part of the URL content. In exemplary embodiments, determining whether the portlet is actually part of the URL content can be done by requesting layout information about the webpage from the web portal application and checking the existence of the portlet in the response feed. If the URL does contain a portlet that is actually part of the webpage, portlet information is added to the variable list which represents navigation state information of the input URL, as shown at block 318. At block 320, the variable list which represents navigation state information of the input URL is output and used to uniquely identify the encoded URL.

Figure 5:
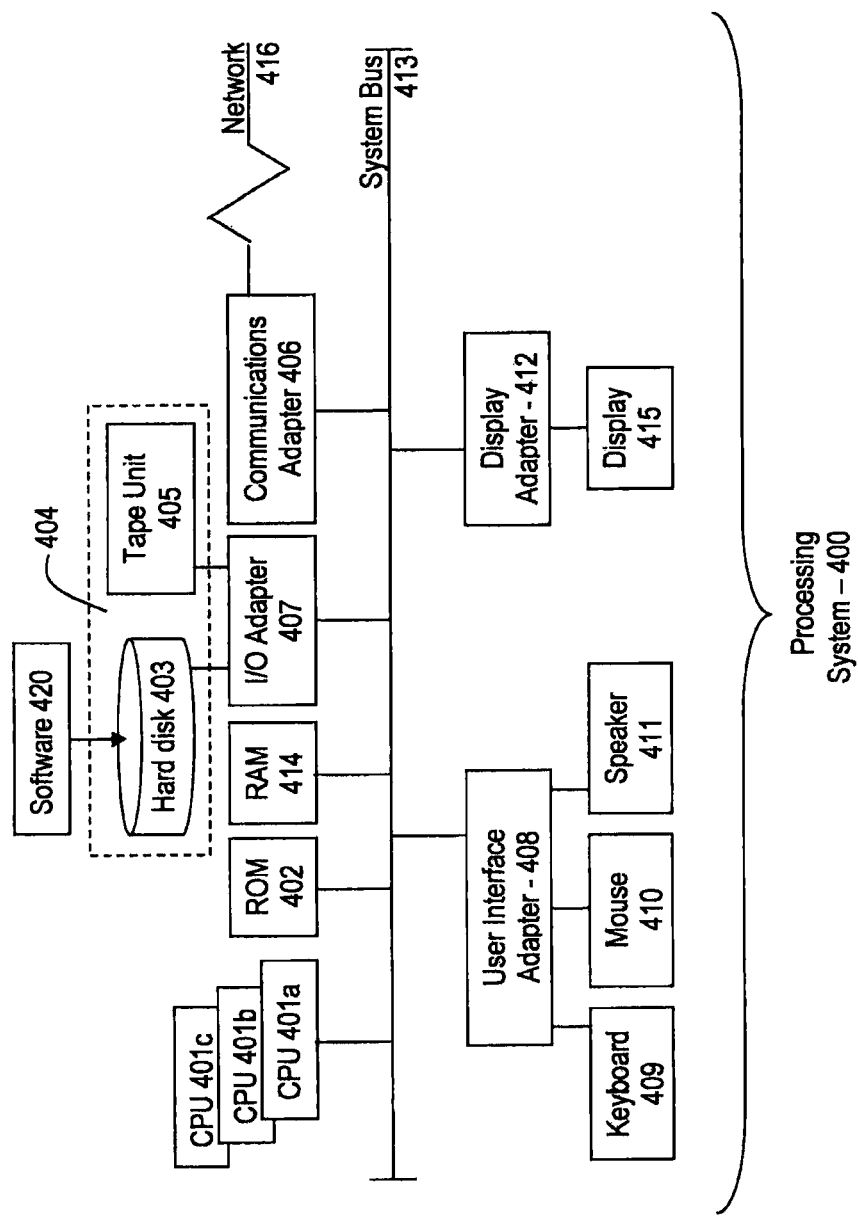
FIG. 5 illustrates one example of a processing system for practice of the teachings herein.

Referring to FIG. 5, there is shown an embodiment of a processing system 400 for implementing the teachings herein. In this embodiment, the system 400 has one or more central processing units (processors) 401a, 401b, 401c, etc. (collectively or generically referred to as processor(s) 401). In one embodiment, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of system 400.

FIG. 5 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. A network adapter 406 interconnects bus 413 with an outside network 416 enabling data processing system 400 to communicate with other such systems. A screen (e.g., a display monitor) 415 is connected to system bus 413 by display adaptor 412, which may include a graphics adapter to improve the performance of graphics intensive applications and a video controller. In one embodiment, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 413 via user interface adapter 408 and display adapter 412. A keyboard 409, mouse 410, and speaker 411 all interconnected to bus 413 via user interface adapter 408, which may include, for example, a Super I/O chip integrating multiple device adapters into a single integrated circuit.

Thus, as configured in FIG. 5, the system 400 includes processing means in the form of processors 401, storage means including system memory 414 and mass storage 404, input means such as keyboard 409 and mouse 410, and output means including speaker 411 and display 415. In one embodiment, a portion of system memory 414 and mass storage 404 collectively store an operating system such as the AIX® operating system from IBM Corporation to coordinate the functions of the various components shown in FIG. 1.

It will be appreciated that the system 400 can be any suitable computer or computing platform, and may include a terminal, wireless device, information appliance, device, workstation, mini-computer, mainframe computer, personal digital assistant (PDA) or other computing device.

Examples of operating systems that may be supported by the system 400 include Windows 95, Windows 98, Windows NT 4.0, Windows XP, Windows 2000, Windows CE, Windows Vista, Macintosh, Java, LINUX, and UNIX, or any other suitable operating system. The system 400 also includes a network interface 416 for communicating over a network. The network can be a local-area network (LAN), a metro-area network (MAN), or wide-area network (WAN), such as the Internet or World Wide Web. Users of the system 400 can connect to the network through any suitable network interface 416 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 400 includes machine readable instructions stored on machine readable media (for example, the hard disk 404) for capture and interactive display of information shown on the screen 415 of a user. As discussed herein, the instructions are referred to as "software" 420. The software 420 may be produced using software development tools as are known in the art. Also discussed herein, the software 420 may also referred to as a "command line testing tool" 420, an "a testing interface" 420 or by other similar terms. The software 420 may include various tools and features for providing user interaction capabilities as are known in the art.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method, comprising:

Receiving, using a computing device, an encoded URL corresponding to a web-portal page hosted by a web-portal server, wherein a text of the encoded URL does not provide information about content of the web-portal page, the content comprising a plurality of re-arrangeable portlets, and wherein the web-portal server provides, via a representational state transfer service, to a web-crawler, a navigational state information of the web-portal page using a predetermined format;

initializing a list of parameters, wherein the list identifies that the web-portal page corresponding to the encoded URL has been visited, and determining the parameters to add to the list by:

sending the encoded URL to the representational state transfer service from the web-portal server hosting the web-portal page for decoding the encoded URL;

receiving the navigational state information of the web-portal page from the representational state transfer service, wherein the navigational state information is decoded from the encoded URL, and comprises a selection-node-ID and a resource-ID, the selection-node-ID being an identifier assigned to the web-portal page, and the resource-ID being an identifier associated with a resource used by the web-portal page, wherein, determining a type of the encoded URL based on the received representational state information, and when the type is determined to be a resource URL, storing the resource-ID in the list of parameters; and when the type is determined to be an engine URL, storing the selection-node-ID in the list of parameters, and when the type is determined to be a portlet, storing information of the portlet in the list of parameters;

determining if the encoded URL has been previously visited based on the list of parameters; and retrieving the content associated with the encoded URL if the encoded URL has not been previously visited.

2. The method of claim 1, further comprising: analyzing content associated with the encoded URL; and exploring an additional URL found in the content associated with the encoded URL.

3. The method of claim 2, further comprising detecting if the additional
URL is a logout link prior to exploring the additional URL.

4. The method of claim 1, wherein the navigational state information from the representational state transfer service is received in XML format.

5. The method of claim 1, wherein the navigational state information includes information indicative of the type of the encoded URL.

6. The method of claim 1, wherein the web-portal server uses websphere portal framework.

* * * * *